Feb. 29, 1944. C. SHAW 2,342,701
VENEER LATHE ATTACHMENT
Filed Aug. 13, 1941  2 Sheets-Sheet 1
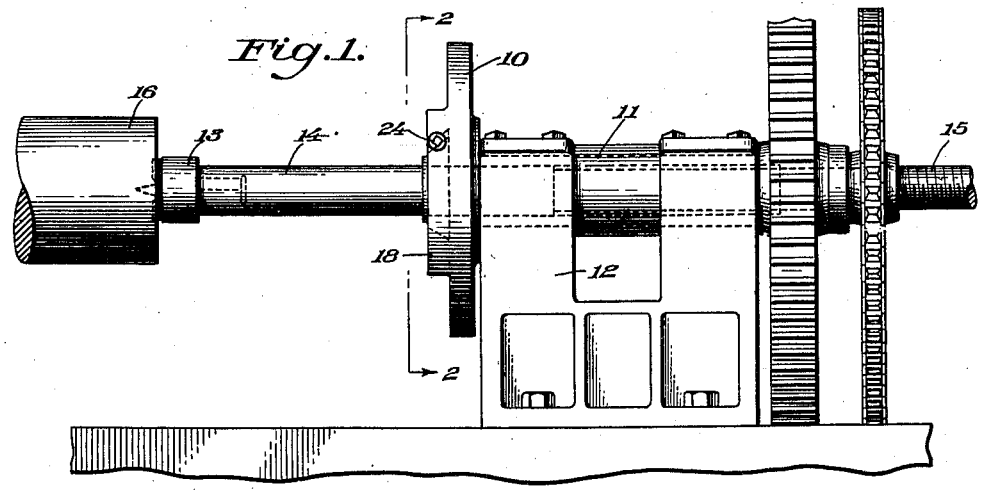
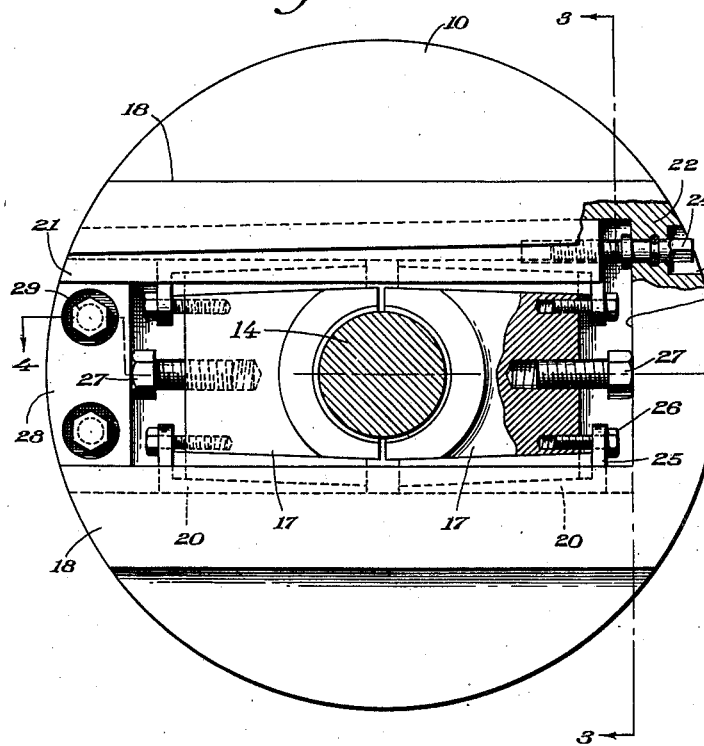 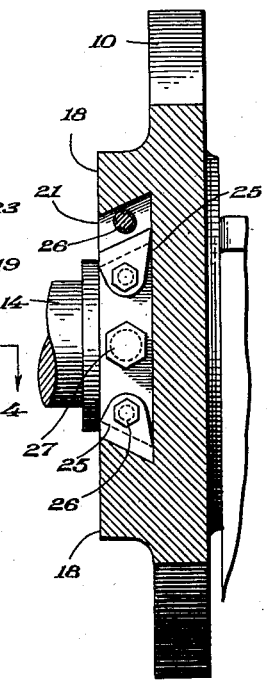
Claude Shaw:
INVENTOR Feb. 29, 1944.    C. SHAW    2,342,701
VENEER LATHE ATTACHMENT
Filed Aug. 13, 1941    2 Sheets-Sheet 2

Claude Shaw,
INVENTOR
BY Victor J. Evans & Co.
ATTORNEYS

Patented Feb. 29, 1944

2,342,701

UNITED STATES PATENT OFFICE 2,342,701

VENEER LATHE ATTACHMENT

Claude Shaw, Bristol, Va.

Application August 13, 1941, Serial No. 406,686

4 Claims. (Cl. 279—112)

In a lathe and particularly that of the stay-log form constructed to be convertible into a straight lathe, the center is axially adjustable of the spindle to bring the former into engagement with the work. Generally this adjustment is through the instrumentality of a threaded connection between the spindle and the shank of the center but where the latter protrudes through the face plate, the shank has a snug bearing in the spindle. In the operation of the lathe, however, the knife imposes a lateral strain on the center and this continual pressure results in wear in the bore of the spindle at the face plate end. After continued use, the spindle bore becomes so enlarged at the end facing the work that considerable lateral spring is afforded the center with the result that the prescribed thickness of veneer can not be maintained with regularity. To repair a spindle which has been subjected to such wear is an expensive procedure and it is the primary purpose of the present invention to provide adjustable means for clamping or securing the center to the spindle, after the former has been engaged with the work, so that this tendency to lateral movement of the center will be absolutely precluded.

It is a further object of the invention to provide a clamping means demountably carried on the spindle or the face plate thereof and comprising independently adjustable elements so that the clamping operation can be effected without danger of deflecting the center out of its axial coincidence with the spindle.

Further, it is an object of the invention to provide a spindle clamping means adaptable for use with convertible stay-log machines and applicable to the spindle in place and where the arm of the stay-log is engaged with the spindle.

A still further object of the invention is to provide means of the kind indicated which is of comparatively simple form and therefore susceptible of cheap manufacture.

With this object in view, the invention consists of a construction and combination of parts of which preferred embodiments are illustrated in the accompanying drawings, wherein:

Figure 1 is a side elevational view of one of the heads of a convertible stay-log lathe showing the invention applied in operative position thereon.

Figure 2 is a sectional view on the plane indicated by the line 2—2 of Figure 1.

Figure 4:
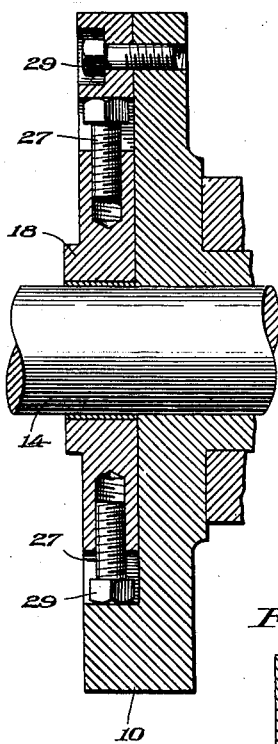

Figures 3 and 4 are sectional views on the planes indicated by the lines 3—3 and 4—4 of Figure 2.

Figure 5:
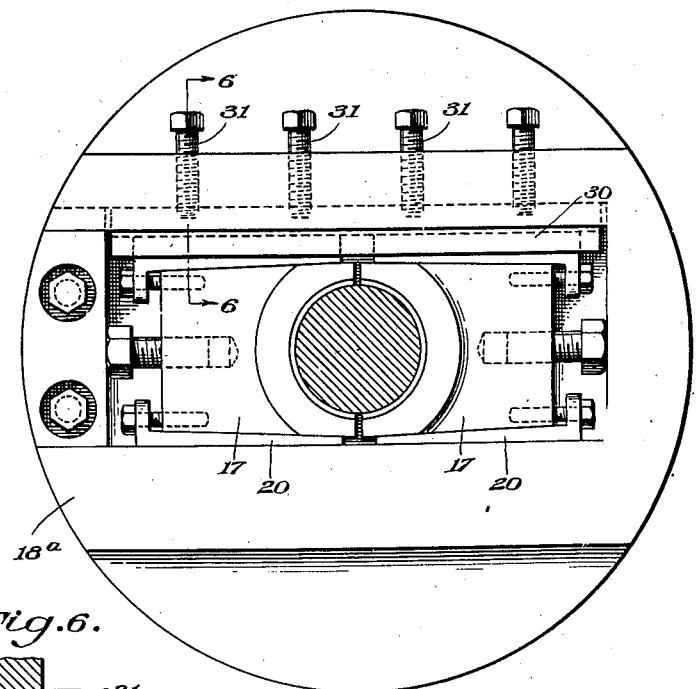

Figure 5 is a view similar to Figure 2 but shows a modified form of mounting the clamping means.

Figure 6:
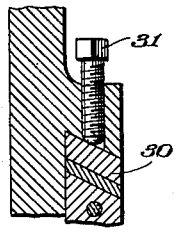

Figure 6 is a sectional view on the plane indicated by the line 6—6 of Figure 5.

The convertible stay-log machine differs only from the straight veneer lathe in that the latter has no means for mounting the stay-log but is adapted only to support the work on centers and peel off the veneer in ribbons, rather than sheets, as in the stay-log. Where the invention is used on a convertible stay-log machine, it is mounted in the guide in the face plate 10 in which the arm of the stay-log is mounted when the machine is used as a stay-log machine. The spindle 11 is mounted to rotate in bearings in the pillow block 12 and while the face plate 10 may be a separate element secured to the spindle, it is generally formed as a flange at the forward end of the spindle.

The center, of which the head 13 is removably secured at the forward end of the shank 14, is moved axially of the spindle by reason of an internal thread in the latter which is engaged with an external thread 15 on the spindle shank at the rear end. Where the shank of the center projects through the face plate end of the spindle, the bore of the latter is smooth to provide a snug slide bearing for the shank.

In the operation of the lathe, when the work 16 is mounted on centers, the pressure of the knife imposes a considerable lateral pressure on the spindle shanks 14 at points diametrically opposite the point of position of the knife and this continual lateral pressure results in wearing the bore of the spindle at the end facing the work, so that there can be after a time, a considerable lateral play of the center shank with resultant defective work in cutting the ribbon of veneer.

But if the shank of the center be rigidly secured to the spindle after the work has been mounted, this lateral play is precluded.

In the form of the invention shown, the jaws 17 constitute the means for effecting a rigid connection between the shank of the center and the spindle, these jaws being mounted in the guideway 18 formed in the face plate 10. The guideway 18 is designed to receive the arms of the stay-log when the machine is used as a stay-log lathe, being open at one end and closed at the other end, as indicated in Figure 2, thus providing a shoulder 19.

The guide 18 is in the form of a dovetail slot of which the walls of opposite sides are formed of converging lines, so that the one side wall of the slot inclines slightly toward the other. The undercutting of the side walls to form the dovetail slot constitutes means by which the jaws 17 are held in the guide, liners 20 being interposed between the jaws and the side walls of the guide on the one side and between the jaws and a gib 21 on the other side. The gib is formed with a slight taper and is longitudinally adjustable by means of screw which is threaded into the gib but has a rotary bearing in the block portion 22 of the face plate, which block portion is socketed, as indicated at 23, so that a wrench may be applied to the wrench seat 24 on the adjusting screw.

The liners 20 are tapered and are formed with angular ends 25 forming ears through which cap screws 26 pass, the latter threading into the jaws. Obviously the degree to which the cap screws are set determines the positions of the liners. The jaws, at the side edges, are tapered at an angle corresponding to the taper of the liners 20.

The jaws are adjusted towards each other and thereby brought into engagement with the shank 14 of the center by the adjustment of the cap screws 27 which are larger than the cap screws 26, one of these cap screws abutting the shoulder 19 and the other the shoulder formed by a removable block 28 secured to the face plate to close the normally open end of the guide. Cap screws 29 secure the block 28 in place.

The gib 21 is adjusted to effect a reasonably snug fit of the jaws in the guide, proper adjustment of the liners 20 effecting proper positioning of the jaws relative to the shank 14 of the center.

After the center has been engaged with the work, as indicated in Figure 1, the rotation of the set screws 27 will cause the jaws 17 to be moved toward each other and thereby brought into engagement with the shank 14 of the center, thus effecting a rigid mounting of it in the face plate at the center. The cap screws, abutting the shoulders formed at the closed end of the guide and by the block 28, constitute the means for advancing the jaws into clamping engagement with the shank 14. By having the jaws independently adjustable, effective clamping of the shank can be effected without disturbance to its axial coincidence with the axis of the spindle.

In the modification shown in Figure 5, the general arrangement of the construction of Figures 1 and 2 is adhered to, the jaws 17 being equipped with the liners 20 but the tapering gib being replaced with a straight gib 30, the side walls of the guide 18a being parallel rather than with one of them at a slight inclination toward the other. Set screws 31 pass through one wall of the guide and bear upon the gib to keep the latter in place and provide for the proper adjustment along with the proper adjustment of the liners for centrally positioning the jaws.

The invention having been described, what is claimed as new and useful is:

1. A spindle chuck, comprising a spindle, a face plate carried by one end of the spindle and provided with a guide formed therein of a shape of a dovetail slot arranged diametrically of the face plate, jaws mounted in the guide, liners adjustably connected to the jaws, and an adjustable gib mounted in the guide and bearing upon the liners at one side.

2. A spindle chuck, comprising a spindle, a face plate carried by the spindle provided with a guide formed therein of a dovetail slot shape arranged diametrically of the face plate, jaws arranged in the guide, liners adjustably connected with the jaws, and an adjustable gib mounted in the guide and bearing upon the liners at one side, the liners being longitudinally tapered.

3. A spindle chuck, comprising a spindle, a face plate carried by the spindle having a guide formed therein of the dovetail slot shape arranged diametrically of the face plate, jaws mounted in the guide, liners adjustably connected with the jaws, and an adjustable gib mounted in the guide and bearing upon the liners at one side, the liners being longitudinally tapered and the gib being longitudinally tapered, the wall of the guide adjacent the gib being at a slight inclination to the opposite wall of the guide.

4. A spindle chuck, comprising a spindle, a face plate carried by the spindle having a guide formed therein of the dovetail slot shape arranged diametrically of the face plate, jaws mounted in the guide, liners adjustably connected with the jaws, and an adjustable gib mounted in the guide and bearing upon the liners at one side, the liners being longitudinally tapered outwardly towards the spindle and the gib correspondingly tapered, the wall of the guide adjacent the gib being at a slight inclination to the opposite wall of the guide.

CLAUDE SHAW.